United States Patent
Zaidman et al.

(10) Patent No.: US 10,990,316 B2
(45) Date of Patent: Apr. 27, 2021

(54) LOG-BASED STORAGE FOR DIFFERENT DATA TYPES IN NON-VOLATILE MEMORY

(71) Applicant: Western Digital Technologies, Inc., San Jose, CA (US)

(72) Inventors: Mikhael Zaidman, Modiin (IL); Yonatan Halevi, Petah Tikva (IL); Judah Gamliel Hahn, Ofra (IL); Arseniy Aharonov, Rehovot (IL); Yoav Markus, Tel Aviv (IL)

(73) Assignee: Western Digital Technologies, Inc., San Jose, CA (US)

(*) Notice: Subject to any disclaimer, the term of this patent is extended or adjusted under 35 U.S.C. 154(b) by 49 days.

(21) Appl. No.: 16/457,298

(22) Filed: Jun. 28, 2019

(65) Prior Publication Data

US 2020/0409588 A1    Dec. 31, 2020

(51) Int. Cl.
*G06F 3/06* (2006.01)
*G06F 16/907* (2019.01)
*G06F 16/17* (2019.01)

(52) U.S. Cl.
CPC .......... *G06F 3/0652* (2013.01); *G06F 3/0619* (2013.01); *G06F 3/0679* (2013.01); *G06F 16/1734* (2019.01); *G06F 16/907* (2019.01)

(58) Field of Classification Search
CPC ............ G06F 12/0246; G06F 12/0253; G06F 3/0604; G06F 3/064; G06F 3/0652; G06F 3/0679; G06F 3/0688; G06F 2212/7205
See application file for complete search history.

(56) References Cited

U.S. PATENT DOCUMENTS

| | | | |
|---|---|---|---|
| 2017/0242788 A1* | 8/2017 | Ahmed | G06F 3/0616 |
| 2018/0260331 A1* | 9/2018 | Kotte | G06F 12/0246 |
| 2019/0121567 A1* | 4/2019 | Kim | G06F 3/0644 |
| 2019/0294333 A1 | 9/2019 | Zaidman et al. | |

* cited by examiner

*Primary Examiner* — Reginald G Bragdon
*Assistant Examiner* — Curtis James Kortman
(74) *Attorney, Agent, or Firm* — Vierra Magen Marcus LLP

(57) ABSTRACT

An illustrative embodiment disclosed herein is an apparatus including a processor having programmed instructions that write data having mixed deletion characteristics sequentially to a plurality of data entries of a first physical erase block (PEB) in intermediate storage. The data having the mixed deletion characteristics includes first data having a first deletion characteristic. The processor has programmed instructions that maintain metadata in a plurality of metadata entries in a log. The metadata corresponds to the data having the mixed deletion characteristics. The processor has programmed instructions that identify, using the log, the first data having the first deletion characteristic and evacuate the first data having the first deletion characteristic to a second PEB in main memory.

20 Claims, 5 Drawing Sheets

LOG-BASED STORAGE FOR DIFFERENT DATA TYPES IN NON-VOLATILE MEMORY

BACKGROUND

In non-volatile memory systems, a file system may control how data from multiple log file system is stored and retrieved through interactions with a flash translation layer. In certain embodiments, due to hardware constraints, the file system may interact with the flash translation layer to write the data from the multiple log file system logs to a single physical erase block.

SUMMARY

The present disclosure, in various embodiments, relates to non-volatile memory and more particularly relates to separating mixed data with different data types.

An illustrative embodiment disclosed herein is an apparatus including a processor having programmed instructions that write data having mixed deletion characteristics sequentially to a plurality of data entries of a first physical erase block (PEB) in intermediate storage. The data having the mixed deletion characteristics includes first data having a first deletion characteristic. The processor has programmed instructions that maintain metadata in a plurality of metadata entries in a log. The metadata corresponds to the data having the mixed deletion characteristics. The processor has programmed instructions that identify, using the log, the first data having the first deletion characteristic and evacuate the first data having the first deletion characteristic to a second PEB in main memory.

Another illustrative embodiment disclosed herein is a system including a host log history (HLH) log and a controller coupled to the HLH log. The controller writes data having mixed deletion characteristics sequentially to a plurality of data entries of a first physical erase block (PEB) in intermediate storage. The data having the mixed deletion characteristics includes first data having a first deletion characteristic. The controller maintains metadata in a plurality of metadata entries in the HLH log. The metadata corresponds to the data having the mixed deletion characteristics. The controller identifies, using the HLH log, the first data having the first deletion characteristic and evacuates the first data having the first deletion characteristic to a second PEB in main memory.

Another illustrative embodiment disclosed herein is a method including writing, by a controller, data having mixed deletion characteristics sequentially to a plurality of data entries of a first physical erase block (PEB) in intermediate storage. The data having the mixed deletion characteristics includes first data having a first deletion characteristic. The method includes maintaining, by the controller, metadata in a plurality of metadata entries in a log. The metadata corresponds to the data having the mixed deletion characteristics. The method includes identifying, by the controller and using the log, the first data having the first deletion characteristic and evacuating, by the controller, the first data having the first deletion characteristic to a second PEB in main memory.

DETAILED DESCRIPTION

Figure 1:
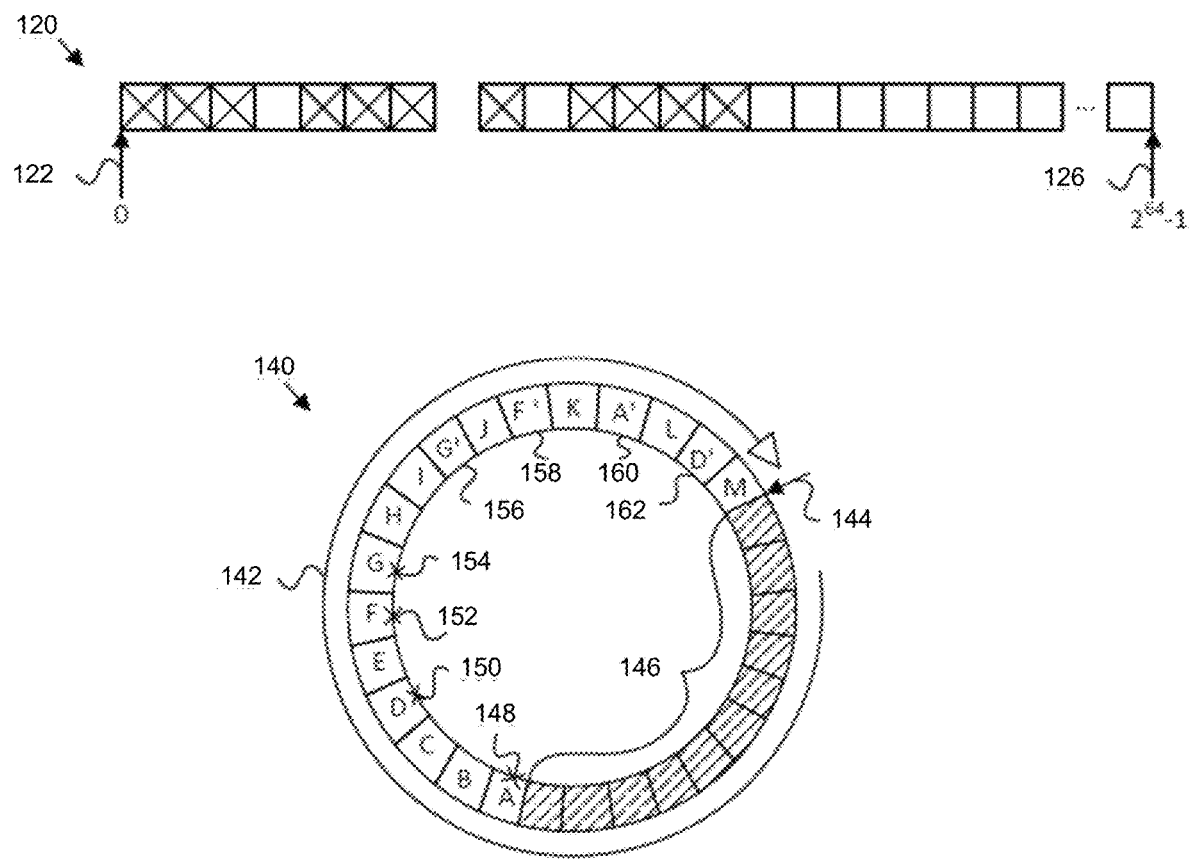
FIG. 1 depicts one embodiment of a logical address space, and a sequential, log-based, append-only writing structure such as found in a log structured file system, in accordance with some embodiments.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and make part of this disclosure.

A multi-log file system manages several log file system (LFS) logs to separate data with different data types. Flash storage devices interface with the multi-log file systems to store the data of the several LFS logs. In the mobile and embedded storage segment, due to resource constraints, it is not practical to have an open physical erase block (PEB) per LFS log in the flash transition layer (FTL) of the flash storage device. Thus, in some embodiments, all LFS logs are written into a single open PEB, and the corresponding data is mixed in the physical media.

Mixing several LFS logs in one PEB increases fragmentation of the logically sequential data in the PEB. The first impact of fragmentation is due to caching efficiency. When data from a log is written sequentially to a PEB, a logical to physical (L2P) mapping of data in the PEB can be compressed with a given compression ratio and cached to RAM. Serving multiple read requests with the L2P accessible in RAM can result in improved read performance. However, fragmentation reduces the compression ratio and the efficiency in caching the L2P in RAM, which, in turn, negatively impacts overall read performance.

The second impact of fragmentation is due to FTL Data Path (DP) pipe efficiency. The DP includes N dies performing sequential reads in parallel. However, not all dies are utilized when the data is not physically contiguous. Mixing all logs in a single block results in data that is not logically contiguous, and by consequence, not physically contiguous, resulting in degraded sequential read performance.

Mixing several LFS logs increases a number of discarded data in multiple physical blocks. The increase of discarded data in multiple physical blocks leads to excessive FTL metadata updates and multiple relocations of valid data by FTL garbage collection (GC). The excessive metadata updates and relocations increase write amplification and reduce flash device performance. What is needed is a system and method that can operate under the resource constraints to separate the different data types of the several LFS logs and store data of each data type in dedicated storage to ensure that logically contiguous data is also physically contiguous.

In embodiments of the disclosure described herein, a system and method for separating data of different data types is shown. In one embodiment, the system tracks the data with metadata entries in a host logs history (HLH) log. In one embodiment, portion of the HLH log is cached into RAM for faster reads. In one embodiment, the system selects a log candidate to be evacuated to main memory based on a data type identified in the metadata entries. In one embodiment, the system uses a "biggest first" evacuation policy to evacuate multiple data entries having a common data type to a physical erase block assigned to the data type.

In some embodiments of the present disclosure, the system improves spacial locality of the LFS logs. As a consequence, the system and method improves performance due to a better L2P cache compression ratio and a better utilization of the FTL DP pipe when logically contiguous data is also physically contiguous. In some embodiments, the system reduces write amplification in FTL GC actions.

In certain embodiments, a file system, as used herein may refer to a system that controls how data or units of data are stored and retrieved through interactions with a flash translation layer (FTL). As described herein, data may refer to information that has been codified so as to be storable in a computer readable medium. Further, the file system may manage files and perform operations on the files. In certain implementations, the file system refers to a logical file system, where the file system is responsible for file and file-level operations between the memory and a user application. Further, the file system may pass requested operations to a flash translation layer for processing. In at least one implementation, the file system may be a log structured file system.

As used herein, a flash translation layer (FTL) may refer to a driver or controller that controls the flash memory as to cause a linear flash memory to appear to the file or operating system like a disk drive. To cause flash memory to appear as a disk drive, the FTL may create "virtual" small blocks of data out of the larger erase blocks of the flash memory. Also, the FTL may manage data on the flash memory such that it appears to be "write in place" when the managed data is actually stored in different locations in the flash memory. Further, the FTL may manage the flash memory so there are clean/erased places to store data.

FIG. 1 depicts one embodiment of a logical address space 120, and a sequential, log-based, append-only writing structure 140 such as found in a log structured file system. The logical address space 120 of a non-volatile memory device, in the depicted embodiment, may be larger than the physical storage capacity and corresponding storage device address space of the non-volatile memory device. In the depicted embodiment, the non-volatile memory device has a 64-bit logical address space 120 beginning at logical address "0" 322 and extending to logical address "$2^{64}$-1" 326. As illustrated, the logical address space 120 may store data at the locations marked by an "X" and may have available locations for storing data at the locations lacking an "X". Because the storage device address space corresponds to only a subset of the logical address space 120 of the non-volatile memory device, the rest of the logical address space 120 may be restricted or used for other functions of the non-volatile memory device.

The sequential, log-based, append-only writing structure 140, in the depicted embodiment, is a logical representation of physical storage media of the non-volatile memory device. In certain embodiments, the non-volatile memory device stores data sequentially, appending data to the log-based writing structure 140 at an append point 144. Non-volatile storage media storing deallocated/unused logical blocks, in the depicted embodiment, is added to an available storage pool 146 for the non-volatile memory device. By clearing invalid data from the non-volatile memory device, and adding the physical storage capacity corresponding to the cleared data back to the available storage pool 146, in one embodiment, the log-based writing structure 140 is cyclic, ring-like, and has a theoretically infinite capacity.

In the depicted embodiment, the append point 144 progresses around the log-based, append-only writing structure 140 in a circular pattern 142 storing data "A" through "M". In one embodiment, the circular pattern 142 wear balances the non-volatile memory media, increasing a usable life of the non-volatile memory media. In the depicted embodiment, the file system may mark several blocks 148, 150, 152, 154 as invalid, represented by an "X" marking on the blocks 148, 150, 152, 154. The file system, in one embodiment, may recover the physical storage capacity of the invalid blocks 148, 150, 152, 154 and may add the recovered capacity to the available storage pool 146. The file system may overwrite the invalid blocks with new data. In the depicted embodiment, modified versions of the blocks 148, 150, 152, 354 have been appended to the log-based writing structure 340 as new blocks 156, 158, 160, 162 in a read, modify, write operation or the like, allowing the original blocks 148, 150, 152, 154 to be recovered.

In certain embodiments, the log-based writing structure such as log-based writing structure 140 maintains multiple logs. In at least one embodiment, data may be saved into one of the multiple logs based on different factors. For example, data may be saved into different logs based on a data type. As used herein, a data type is a characterization of data. A data type may describe a source of the data, frequency or recency at which the data is updated and/or deleted (e.g. a deletion characteristic), and the like. In at least one implementation, where the data may be saved into different logs based on a data type that describes the frequency at which the data is updated and/or deleted, the data may be saved into a hot log, a warm log, and a cold log.

In certain embodiments, the log-based writing structure may be controlled by a flash friendly file system (F2FS). As part of the F2FS, the file system may maintain multiple logs. In one embodiment, the F2FS may maintain six logs, including a hot node log, a hot data log, a warm node log, a warm data log, a cold node log, and a cold data log. For example, the F2FS may determine that data belongs in a hot node log when the data represents a direct node block for a directory. The F2FS may determine that data belongs in a hot data log when the data is stored in a directory entry block. The F2FS may determine that data belongs in a warm node log, when the data is stored in a direct node block for regular files. The F2FS may determine that data belongs in a warm data log when the data is stored in a data block made by a user. The F2FS may determine that data belongs in a cold node log when the data is stored in an indirect node block. The F2FS may determine that data belongs in a cold data log when the data is stored in a data block moved by cleaning, stored in a data block specified by a user, or multimedia file data. In one embodiment, the F2FS writes random data sequentially into logs in F2FS segments of 2 MB size. In one embodiment, the F2FS cleans (e.g. mark blocks as invalid) sections. A size of a section may be a multiple of a size of a segment. In one embodiment, the size of the segment is equal to the size of a physical erase block in non-volatile memory.

Figure 2:
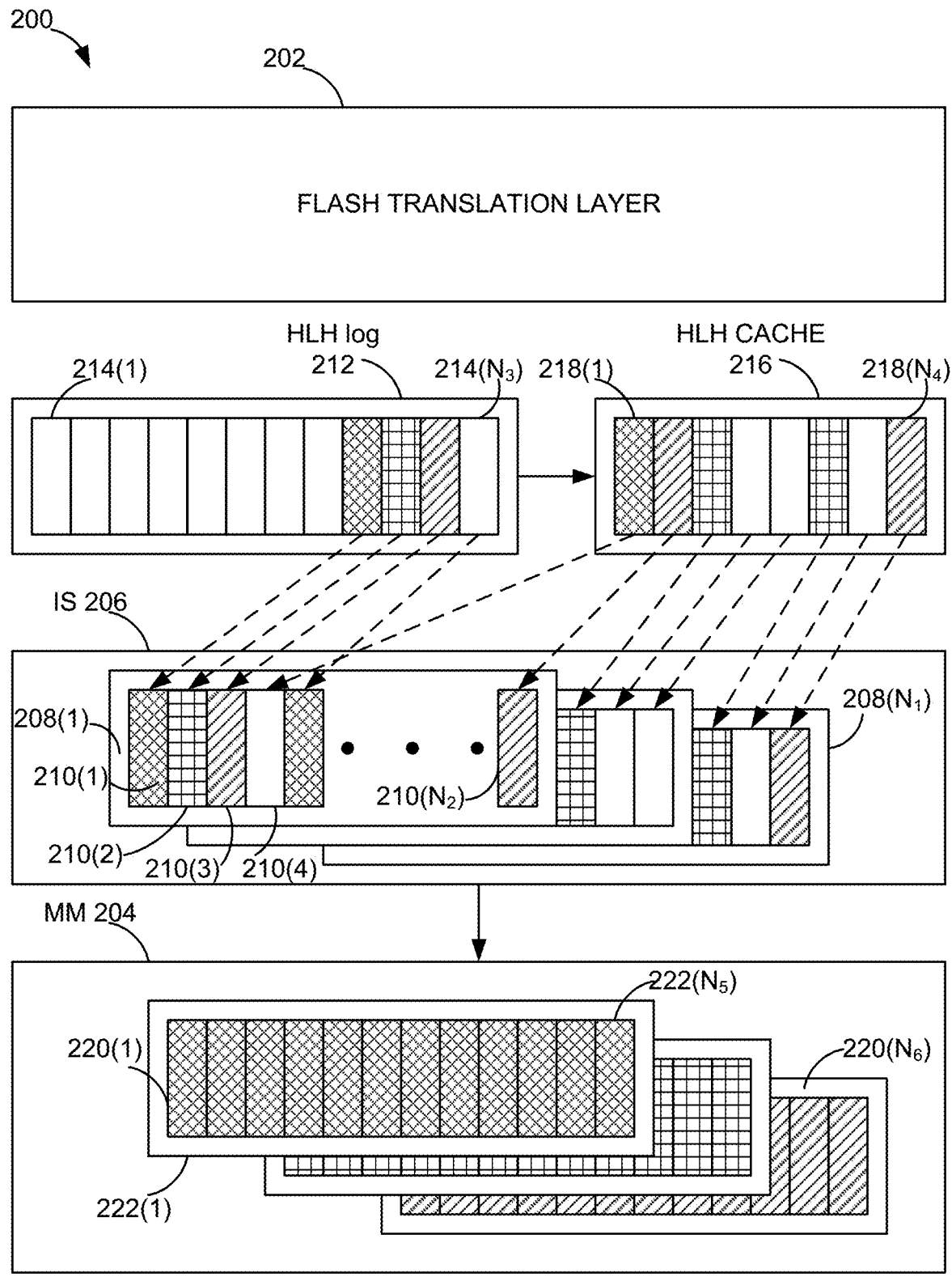
FIG. 2 depicts a system for separating mixed data with different data types, in accordance with some embodiments.

FIG. 2 illustrates a system 200 for separating data with different data types. The system 200 includes a flash translation layer (FTL) 202. The FTL 202 may translate the logical addresses for the mixed data associated with multiple logs into physical addresses for storage in a main memory (MM) 204. As used herein, mixed data refers to data having different data types. As used herein, the main memory 204 may be a portion of memory on non-volatile memory elements that are used for storing data. In one embodiment, the main memory may include a plurality of multi-level cells, where multiple bits may be stored per cell. Prior to storage in the main memory 204, the mixed data may be stored in an intermediate storage 206. As used herein, the intermediate storage 206 may be a portion of memory into which data may be stored before storing the data in the main memory 204. In one embodiment, the intermediate storage 206 may be a single-level cell storage area where a cell stores a single bit per cell. In one embodiment, the main memory 204 and the intermediate storage 206 are portions of flash memory.

The FTL 202 may receive a write request from a file system to write data from multiple logs. In one embodiment, the file system is on a host coupled to the system 200. In one embodiment, the system 200 is a flash storage device that interfaces with the host. The FTL 202 may write the data from multiple logs to a single open physical erase block (PEB) 208(1) in the intermediate storage (IS) 206. When the data is written to the PEB 208(1) from multiple logs, the data from the multiple logs is intermixed. For example, data from a hot node log, a hot data log, a warm node log, a warm data log, a cold node log, and a cold data log may be written to the PEB 208(1). When the PEB 208(1) has no available space, the FTL 202 may close the PEB 208(1) and open a second PEB 208(2). The FTL 202 may write further data from multiple logs to the second PEB 208(2). In general, the intermediate storage 206 may have $N_1$ PEBs 208(1)-208($N_1$).

The PEB 208(1) keeps data entries. Each unit of the data may be written to a separate data entry. For example, the FTL 202 may write a first data from a first log into a first data entry 210(1) of the PEB 208(1). Each data entry may be associated with a different data type, such as a different deletion characteristic. For example, data entry 210(1) may include data from a hot log, data entry 210(2) may include data from a warm log, and data entry 210(3) may include data from a cold log. The different deletion characteristic is depicted in FIG. 2 with different patterns. Each data entry may be associated with a different input/output type, such as write and discard. For example, data entries 210(1)-210(3) may include data that is to be written. Thus, the data of data entries 210(1)-210(3) may be of the "write" I/O type. In one embodiment, the write I/O type data is synonymous with valid data. Data entry 210(4) may include stale data (e.g. data that is to be written but is superseded by a newer version of the data). Thus, the data entry 210(4) may be of the "discard" I/O type. In one embodiment, the discard I/O type data is synonymous with invalid data. In general, each PEB 208 may have space for $N_2$ data entries 210(1)-210($N_2$). In one embodiment, data entries are of a variable size. In one embodiment, each PEB 208 has a different amount of data entries or data entries of different sizes. In this regard, $N_2$ can be different for each PEB 208.

As part of receiving the write requests, the FTL 202 may receive metadata about the data being written to the intermediate storage 206. The system 200 includes a host log history (HLH) log 212. In one embodiment, the HLH log 212 is a portion of the flash memory. The FTL 202 may write the metadata received as part of the write requests to metadata entries 214(1)-214($N_3$) of the HLH log 212. The metadata entry 214(1) may be referred to as the head of the HLH log 212 and the metadata entry 214($N_3$) may be referred to as the tail of the HLH log 212. Each metadata entry 214 points to a data entry 210 in the intermediate storage 206.

Figure 3:
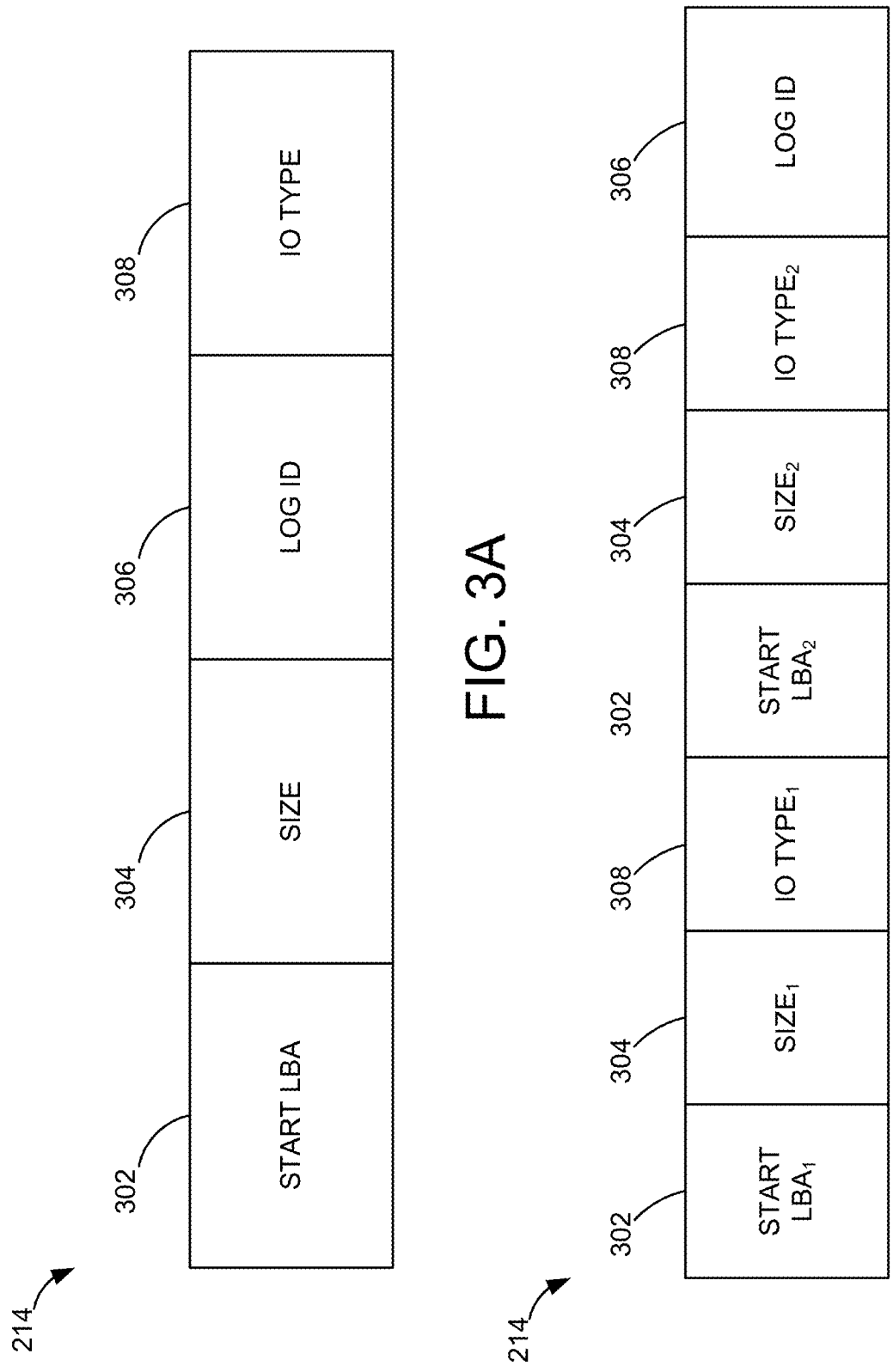
FIG. 3A depicts a metadata entry, in accordance with some embodiments.
FIG. 3B depicts a concatenated metadata entry, in accordance with some embodiments.

Referring now to the example embodiment FIG. 3A, a metadata entry 214 includes a start block address (BA) 302 of the data entry 210, a size 304 of the data entry 210, a log identifier (ID) 306 of the data entry 210, and an I/O type 308 of the data entry 210. In one embodiment, the log ID 306 indicates a type of deletion characteristic of the data stored in the data entry 210. In one embodiment, the I/O type 308 indicates a type of I/O of the data stored in the data entry 210. In one embodiment, the metadata entry 214 is 4 bytes (4B), the start BA 302 is 21 bits (21 b), the size 304 is 7 b, the log ID 306 is 3 b, and the I/O type 308 is 1 b. In one embodiment, the BA 302 is a logical BA (LBA). In one embodiment, the BA 302 is a physical BA (PBA). In one embodiment, the metadata entries point directly to the data entry physical location. In one embodiment, responsive to the BA 302 being a PBA, no L2P translation is needed. In one embodiment, the 7b allocated for the size 304 is not large enough to indicate the size of a data entry 210. In one embodiment, a single data entry 210 may be pointed to by multiple metadata entries 214.

In one embodiment, a first metadata entry and a second metadata entry adjacent to the first metadata entry may have a same log ID indicating a same deletion characteristic. In one embodiment, the FTL 202 determines that the first metadata entry and the second metadata entry have a same deletion characteristic and the FTL 202 concatenates the first metadata entry and the second metadata entry. Referring now to the example embodiment in FIG. 3B, the metadata entry 214 includes a first start LBA 302, a first data size 304, a first data I/O type 308, a second start LBA 302, a second data size 304, a second data I/O type 308, and the log ID 306. Additional, fewer, or different parts may be included in the metadata entries 214, and the parts may be arranged in any order, with respect to FIGS. 3A-B, depending on the embodiment.

Referring back to FIG. 2, the system 200 includes an HLH cache 216. The FTL 202 may write a portion of the HLH log 212 from the tail into the HLH cache 216. In one embodiment, the HLH cache 216 is a portion of random-access memory (RAM). The FTL 202 may write a portion of the metadata entries 214(1)-214($N_3$) to the metadata entries 218(1)-218($N_4$) of the HLH cache 216.

In one embodiment, the FTL 202 selects a portion of the data in the intermediate storage 206. In one embodiment, the selected portion of the data has a same deletion characteristic. The FTL 202 may identify the portion of the data by reading the metadata entries 218 corresponding to (e.g. pointing at the data entries 210 of) the portion of the data. In one embodiment, the FTL 202 may determine that the metadata entries 218 corresponding to the portion of the data have a same log ID 306 indicating a same deletion characteristic. In one embodiment, the FTL 202 evacuates the portion of data from the intermediate storage 206 to the main memory 204. In one embodiment, evacuating data refers to writing data to an append point of a PEB in the main memory 204.

Figure 4:
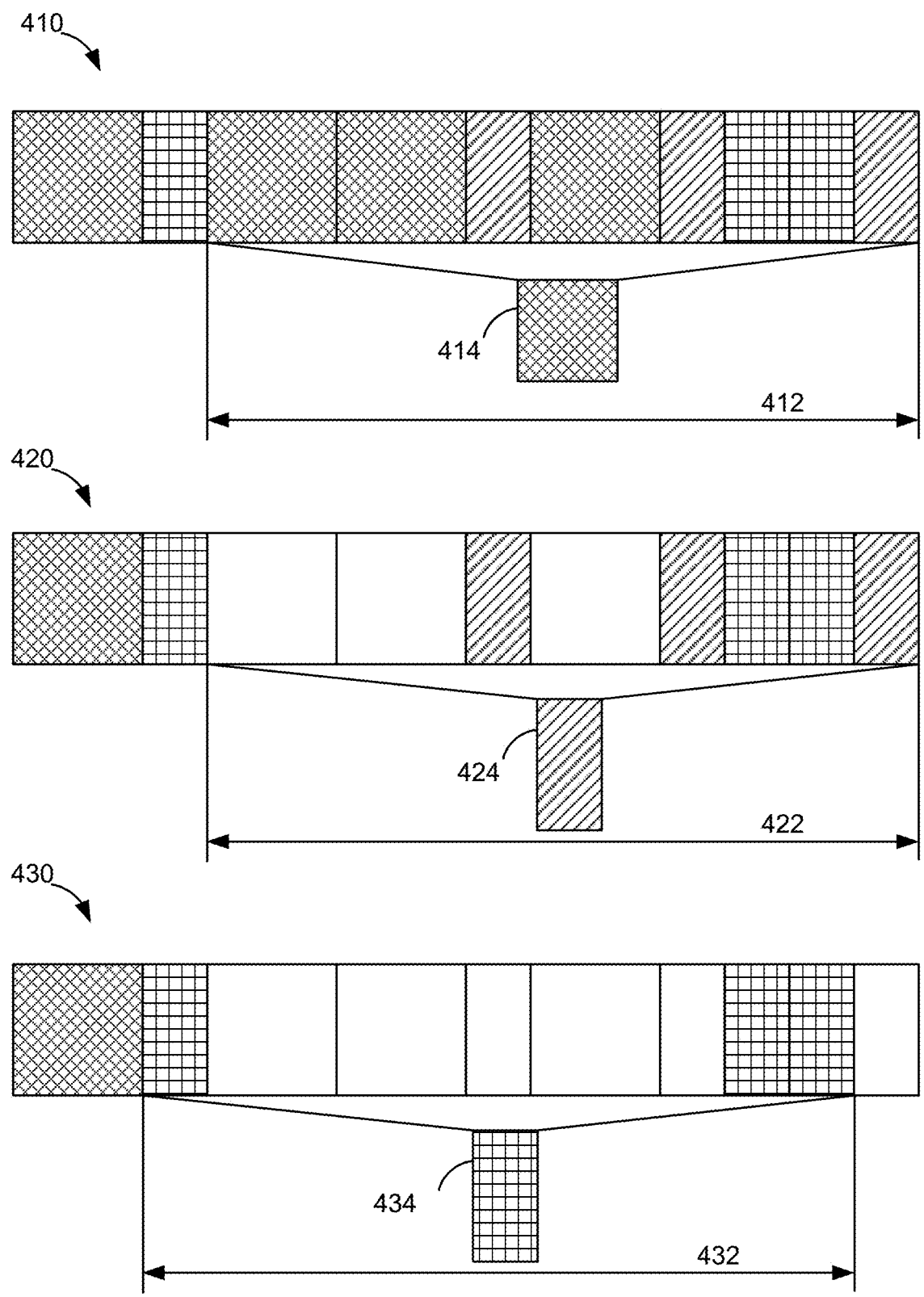
FIG. 4 depicts example embodiments of an HLH cache during selection of evacuation candidates, in accordance with some embodiments.

To cope with fragmentation in the intermediate storage 206 due to selective evacuation into the main memory 204, the FTL 202 determines an HLH log candidate to select, in one embodiment. Referring to FIG. 4, an HLH cache 410 is shown. In one embodiment, the FTL 202 scans (e.g. reads sequentially) metadata entries 218 (with respect to FIG. 2) within a predetermined window 412, starting with the oldest valid metadata entry, for example, the metadata entry 218 ($N_4$) with respect to FIG. 2. In one embodiment, a length of the predetermined window 412 is equal to a number of metadata entries 218 in the HLH cache 410. In one embodiment, the length of the predetermined window 412 is less than the number of metadata entries 218 in the HLH cache 410. The FTL 202 identifies each log ID 306 of the metadata entries 218 within the predetermined window 412, in one embodiment. The different log IDs 306 are represented in FIG. 4 by different patterns. In one embodiment, the FTL 202 determines a data payload corresponding to each identified log ID 306. The FTL 202 computes the data payload corresponding to a log ID 306 as a sum of the sizes 304 of the metadata entries 218 having the log ID 306, in one embodiment. In one embodiment, the FTL 202 computes the data payload a sum of the data entries 210 pointed to by the metadata entries 218 having the log ID 306. In one embodiment, the FTL 202 selects the metadata entries 218 having a first log ID 306 corresponding to the largest data payload. Thus, in the example embodiment of the HLH cache 410 with respect to FIG. 4, the FTL 202 selects the metadata entries 414.

The FTL 202 determines the physical location of the data corresponding to each of the metadata entries 414, in one embodiment. The FTL 202 identifies a start LBA 302 in each of the metadata entries 414, in one embodiment. In one embodiment, the FTL 202 identifies physical addresses of the data by translating each start LBA 302 to a physical address using a logical to physical (L2P) mapping structure. In one embodiment, the L2P mapping structure is stored in the RAM of the system 200.

The system 200 includes the main memory 204. In one embodiment, the FTL 202 identifies a PEB 220(1) of the main memory 204. The identified PEB 220(1) is assigned to data having the first log ID 306 (e.g. having a first deletion characteristic), in one embodiment. In one embodiment, the FTL 202 evacuates the data located at the identified physical addresses to the PEB 220(1) of the main memory 204. In one embodiment, the FTL 202 writes the data located at the identified physical addresses to a portion of data entries 222(1)-222($N_5$). In general, the main memory 204 includes PEBs 220(1)-220($N_6$).

In one embodiment, responsive to evacuating the data corresponding to the metadata entries 414, the FTL 202 indicates in a data structure that the data for those metadata entries has been evacuated. The data structure may be a lookup table having an index corresponding to a metadata entry and a value corresponding to the index indicating whether the data for that metadata entry has been evacuated. In one embodiment, responsive to evacuating the data corresponding to the metadata entries 414, the FTL 202 deletes the metadata entries 414. In one embodiment, the metadata entries 414 are no longer valid metadata entries 414.

Referring back to FIG. 4, an HLH cache 420 is shown as a result of the evacuation of data corresponding to the metadata entries 414. In the HLH cache 420, the metadata entries 414 are depicted as having no pattern to indicate that the metadata entries are no longer valid. In one embodiment, the FTL 202 scans metadata entries within a predetermined window 422, starting with the oldest valid metadata entry. The predetermined window 422 is same as the predetermined window 412, in one embodiment. The FTL 202 identifies each log ID 306 of the metadata entries within the predetermined window 412, excluding any metadata entries for data that has already been evacuated, in one embodiment. In one embodiment, the FTL 202 determines a data payload corresponding to each identified log ID 306. In one embodiment, the FTL 202 selects the metadata entries having a second log ID 306 corresponding to the largest data payload of the remaining metadata entries. Thus, in the example embodiment of the HLH cache 420, the FTL 202 selects the metadata entries 424. The FTL 202 evacuates the data corresponding to the metadata entries 424 to a second PEB 220(2) of the main memory 204, in one embodiment. The identified PEB 220(2) is assigned to data having the second log ID 306, in one embodiment.

An HLH cache 430 is shown as a result of the evacuation of data corresponding to the metadata entries 424. In the HLH cache 430, the metadata entries 414 and the metadata entries 424 are depicted as having no pattern to indicate that the data corresponding to the metadata entries 414 and the metadata entries 424 have been evacuated. In one embodiment, the FTL 202 scans metadata entries within a predetermined window 432, starting with the oldest valid metadata entry. In one embodiment, the FTL 202 determines that the oldest valid metadata entry has changed (e.g. the oldest valid metadata entry of the HLH cache 430 is different than the oldest valid metadata entry of the HLH cache 420). Responsive to determining that the oldest valid metadata entry has changed, the FTL 202 shifts the window 432 so that it starts at the oldest valid entry, in one embodiment. Thus, the predetermined window 432 is same as the predetermined window 422 except that the window 432 is shifted, in one embodiment. The FTL 202 selects the metadata entries 434 having a third log ID 306 corresponding to the largest data payload of the remaining metadata entries, in one embodiment. The FTL 202 evacuates the data corresponding to the metadata entries 434 to a third PEB 220(3) of the main memory 204, in one embodiment. The identified PEB 220(3) is assigned to data having the third log ID 306, in one embodiment.

In one embodiment, upon determining that all of the metadata entries in the HLH cache 216 becoming invalid (e.g. pointing to data that has already been evacuated or indicating discarded data), the FTL 202 may delete the metadata entries and/or overwrite the metadata entries with other metadata entries from the HLH log 212. In one embodiment, the HLH cache 216 is refilled from the HLH log 212 in a sliding manner by writing a portion of the HLH log 212 starting from the tail of the HLH log 212 and progressively towards the head of the HLH log 212 until the HLH cache 216 is refilled.

The FTL 202 continues to write data having a certain type of deletion characteristic (having a certain log ID 306) to the corresponding assigned PEB 220 of the main memory 204. In one embodiment, the main memory 204 has at most a number of open PEBs 220 as a number of log IDs identified by the FTL 202 within a predetermined time period. In one embodiment, upon filling the assigned PEB 220 with data of the certain deletion characteristic, the assigned PEB 220 is closed and a new PEB 220 is assigned to the data with the certain deletion characteristic. In one embodiment, only some of the data corresponding to a first log ID 306 is evacuated to the assigned PEB 220 before the assigned PEB 220 fills up and is thereby closed. In one embodiment, the FTL 202 identifies the new PEB 220 and begins a new scan of a window of the metadata entries 218 in the HLH cache

216. In one embodiment, the FTL 202 selects a second log ID 306 corresponding to second data and corresponding to a largest number of metadata entries (e.g. the metadata entries 414) in the window of the metadata entries 218. In one embodiment, the FTL 202 writes the second data to the new PEB 220.

In one embodiment, responsive first PEB 220 being open for greater than a predetermined threshold, the FTL 202 may select a next log ID of next last valid entry in the HLH cache 216 and evacuate the data corresponding to the next log ID to the first PEB 220, even though the first PEB 220 was not initially assigned to the next log ID. The predetermined condition may be a predetermined amount of time passing, a predetermined number of metadata entries being read, or a predetermined number of data being evacuated to the main memory 204.

The FTL 202 may be implemented as a hardware circuit comprising custom VLSI circuits or gate arrays, off-the-shelf semiconductors such as logic chips, transistors, or other discrete components. The FTL 202 may be implemented in programmable hardware devices such as field programmable gate arrays, programmable array logic, programmable logic devices, or the like. The FTL 202 may also be implemented at least partially in software (e.g. programmed instructions) for execution by various types of processors. The FTL 202 includes the various types of processors, in one embodiment. The software portions may be stored on one or more computer readable and/or executable storage media including non-transitory storage media.

Figure 5:
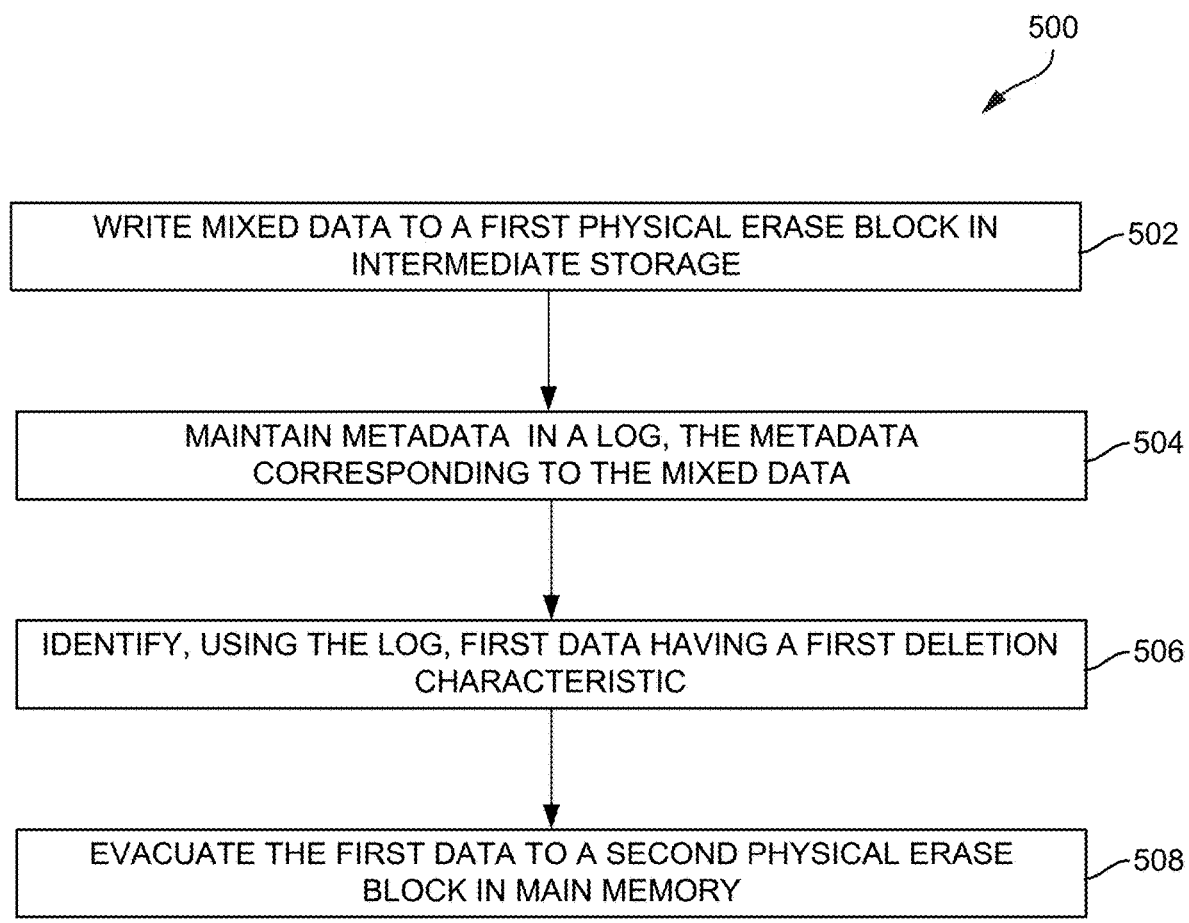
FIG. 5 depicts an example flow chart of a process for separating data with different data types, in accordance with some embodiments.

FIG. 5 depicts an example flow chart of a process 500 for separating data with different data types. The process 500 may be performed by a controller such as the FTL 202 with respect to FIG. 2. Additional, fewer, or different operations may be performed in the process 500 depending on the embodiment. The controller writes mixed data to a first physical erase block (PEB) in intermediate storage (502). Mixed data herein refers to data having mixed data types. In one embodiment, the data types are defined by deletion characteristics. In one embodiment, the controller writes data in units of segments to the first PEB. In one embodiment, a data entry is a unit in the first PEB. The data entry herein is logically contiguous data from one log source (e.g. a hot node log). There may be multiple data entries in one segment.

The controller maintains metadata in a log (504). The metadata corresponds to the mixed data. In one embodiment, the controller writes the metadata in the log as metadata entries. Each metadata entry may point to a different data entry. In one embodiment, the log includes a first log in flash memory and a second log in random-access memory (RAM). In one embodiment, the controller writes the metadata entries to the first log in flash memory. The controller writes a portion of the metadata entries to the second log in RAM, in one embodiment. In one embodiment, the controller uses the second log in RAM to select data to evacuate.

In one embodiment, the controller maintains, in the metadata entries, log IDs identifying different deletion characteristics. The controller may determine that a first metadata entry and a second metadata entry adjacent to the first metadata entry have a same deletion characteristic (e.g. have a same log ID stored in the corresponding log ID field of the metadata entry). The controller may concatenate the first metadata entry and the second metadata entry. The controller maintains, in the metadata entries, input/output (I/O) type identifiers indicating a type of I/O is associated with the data referenced by the metadata entries, in one embodiment. The I/O type identifiers may include write, erase, and discard. In one embodiment, erase is an I/O type wherein data is moved from a mapped address space to an unmapped address space. In one embodiment, discard is a non-secure variant of the erase functionality. In this regard, discard may be an I/O type wherein data is permanently deleted.

The controller identifies, using the log, first data having a first deletion characteristic (506). The controller may scan a window of the metadata entries. In one embodiment, the window has a predetermined length and starts at an oldest valid metadata entry. In one embodiment, the controller may determine a starting location of the window. The controller may, responsive to evacuating data corresponding to the oldest valid metadata entry, shift the window such that the window starts with a next oldest valid metadata entry.

The controller may select a first log ID identifying the first deletion characteristic of first data. In one embodiment, the controller selects the first log ID responsive to the first log ID corresponding to a largest number of metadata entries in the window. The controller determines that a second PEB in main memory is assigned to any data having the first deletion characteristic, in one embodiment. The controller may determine that the second PEB is open for writing.

The controller evacuates the first data to the second PEB in main memory (508). In one embodiment, the controller writes the first data to an append point of the second PEB. In one embodiment, the controller tracks metadata entries in the second log in RAM that point to evacuated data. In one embodiment, responsive to evacuating data corresponding to all the metadata entries in the second log in RAM, the controller overwrite the metadata entries in the second log in RAM with other metadata entries from the first log in flash memory.

In one embodiment, the controller determines that all data entries from the first PEB are evacuated to the main memory. Responsive to the determination, the controller erases the first PEB, in one embodiment. In one embodiment, the controller returns the available space of the first PEB to an available memory pool. In one embodiment, the controller determines that all data entries (from the first PEB) having metadata indicating a write I/O type are evacuated to the main memory. Responsive to the determination, the controller erases the first PEB, in one embodiment.

In one embodiment, the controller determines that all data corresponding to the first log ID is evacuated and that the second PEB has available space (e.g. at the append point). The controller selects a second log ID, in one embodiment. In one embodiment, the second log ID identifies a second deletion characteristic corresponding to second data. The controller writes the second data to the append point of the second PEB, in one embodiment.

Configuration of Exemplary Embodiments

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. An apparatus comprising a processor having programmed instructions that:
   write data having mixed data types sequentially to a plurality of data entries of a first physical erase block (PEB) in intermediate storage, wherein the data having the mixed data types includes first data having a first data type;
   maintain metadata in a plurality of metadata entries in a log, wherein the metadata corresponds to the data having the mixed data types;
   scan a window of the plurality of metadata entries starting with an oldest valid metadata entry;
   select the first data having the first data type responsive to the first data corresponding to a largest number of metadata entries in the window of the plurality of metadata entries; and
   evacuate the first data having the first data type to a second PEB in main memory responsive to the selection.

2. The apparatus of claim 1, the processor having further programmed instructions that:
   determine that the second PEB is open and is assigned to any data having the first data type as a condition to write the first data to the second PEB.

3. The apparatus of claim 1, the processor having further programmed instructions that, responsive to evacuating data corresponding to the oldest valid metadata entry, shift the window such that the window starts with a next oldest valid metadata entry.

4. The apparatus of claim 1, the processor having further programmed instructions that:
   determine that data corresponding to the first data type is evacuated from the first PEB;
   determine that the second PEB is closed;
   identify a third PEB in main memory that is open;
   select a second data type corresponding to second data and corresponding to an updated largest number of metadata entries in the window of the plurality of metadata entries; and
   write the second data to the third PEB.

5. The apparatus of claim 1, wherein the plurality of metadata entries includes a first metadata entry and a second metadata entry adjacent to the first metadata entry, wherein the processor has further programmed instructions that:
   determine that the first metadata entry and the second metadata entry have a same data type; and
   concatenate the first metadata entry and the second metadata entry.

6. The apparatus of claim 1, wherein the log includes a first log in flash memory and a second log in random-access memory (RAM), wherein the plurality of metadata entries include a plurality of first metadata entries in the flash memory and a plurality of second metadata entries in the RAM, wherein the metadata includes first metadata and second metadata, wherein the processor has further programmed instructions that:
   write the metadata to the first metadata entries; and
   write the first metadata to the second metadata entries.

7. The apparatus of claim 6, wherein the data having mixed data types includes second data corresponding to the first metadata, wherein the processor has further programmed instructions that:
   evacuate the second data corresponding to the first metadata; and
   write the second metadata to the second metadata entries.

8. The apparatus of claim 1, the processor having further programmed instructions that:
   determine that a first portion of the plurality of data entries of the first PEB are evacuated to the main memory; and
   erase the first PEB.

9. The apparatus of claim 8, the processor having further programmed instructions that maintains a plurality of input/output (I/O) type identifiers including a write I/O type identifier, wherein the first portion of the plurality of data entries of the first PEB corresponds with the write I/O type identifier.

10. The apparatus of claim 1, wherein:
    the data types comprise different deletion characteristics; and
    the first data type comprises a first deletion characteristic.

11. The apparatus of claim 1, wherein the data types describe a frequency at which the data corresponding to the data types is updated and/or deleted.

12. A system comprising:
    a hosts log history (HLH) log; and a controller coupled to the HLH log, wherein the controller:
writes data having mixed deletion characteristics sequentially to a plurality of data entries of a first physical erase block (PEB) in intermediate storage, wherein the data having the mixed deletion characteristics includes first data having a first deletion characteristic;
maintains metadata in a plurality of metadata entries in the HLH log, wherein the metadata corresponds to the data having the mixed deletion characteristics, wherein the plurality of metadata entries includes a first metadata entry and a second metadata entry adjacent to the first metadata entry;
concatenates the first metadata entry and the second metadata entry responsive to a determination that the first metadata entry and the second metadata entry have a same deletion characteristic;
identifies, using the HLH log, the first data having the first deletion characteristic; and
evacuates the first data having the first deletion characteristic to a second PEB in main memory.

13. The system of claim 12, wherein the controller:
maintains a plurality of log identifiers (IDs) identifying different deletion characteristics;
selects a first log ID of the plurality of log IDs, wherein the first log ID identifies the first deletion characteristic corresponding to the first data;
determines that the second PEB is open and is assigned to any data having the first deletion characteristic; and
writes the first data to the second PEB.

14. The system of claim 13, wherein the controller:
scans a window of the plurality of metadata entries starting with an oldest valid metadata entry; and
selects the first log ID responsive to the first log ID corresponding to a largest number of metadata entries in the window of the plurality of metadata entries.

15. The system of claim 14, wherein the controller, responsive to evacuating data corresponding to the oldest valid metadata entry, shifts the window such that the window starts with a next oldest valid metadata entry.

16. The system of claim 14, wherein the controller:
determines that all data corresponding to the first log ID is evacuated;
selects a second log ID, wherein the second log ID identifies a second deletion characteristic corresponding to second data; and
writes the second data to the second PEB.

17. A method comprising:
writing, by a controller, data having mixed deletion characteristics sequentially to a plurality of data entries of a first physical erase block (PEB) in intermediate storage, wherein the data having the mixed deletion characteristics includes first data having a first deletion characteristic;
maintaining, by the controller, metadata in a plurality of metadata entries in a log, wherein the metadata corresponds to the data having the mixed deletion characteristics, including maintaining a plurality of log identifiers (IDs) identifying different deletion characteristics;
computing, by the controller, a data payload for each log ID in a window of the plurality of metadata entries that starts with an oldest valid metadata entry, wherein computing the data payload for a respective log ID comprises summing data entries in the first PEB that are pointed to by the metadata entries having the respective log ID;
selecting, by the controller, the first data in the first PEB responsive to a first log ID identifying the first deletion characteristic corresponding to a largest data payload; and
evacuating, by the controller, the first data having the first deletion characteristic to a second PEB in main memory responsive to the selection.

18. The method of claim 17, further comprising:
determining, by the controller, that the second PEB is open and is assigned to any data having the first deletion characteristic; and
wherein evacuating, by the controller, the first data having the first to a second PEB in main memory comprises writing the first data to the second PEB.

19. The method of claim 17, further comprising, responsive to evacuating data corresponding to the oldest valid metadata entry, shifting, by the controller, the window such that the window starts with a next oldest valid metadata entry.

20. The method of claim 17, further comprising:
determining, by the controller, that data corresponding to the first log ID is evacuated;
determining, by the controller, that the second PEB is closed;
identifying, by the controller, a third PEB in main memory that is open;
selecting, by the controller, a second log ID, wherein the second log ID identifies a second deletion characteristic corresponding to second data and corresponding to an updated largest number of metadata entries in the window of the plurality of metadata entries; and
write the second data to the third PEB.

* * * * *